Dec. 28, 1965
H. E. LAUCKNER
3,226,607
ELECTRICAL CAPACITOR
Filed May 26, 1960
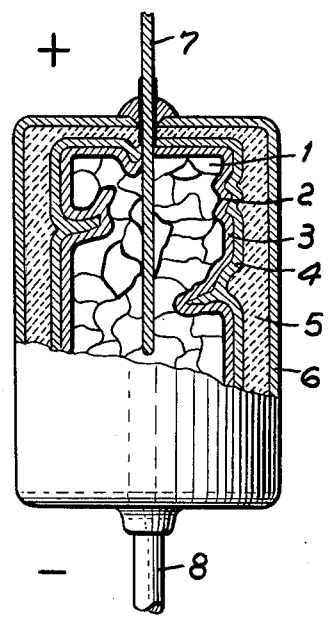
INVENTOR.
HANS E. LAUCKNER
BY
ATTORNEY United States Patent Office 3,226,607
Patented Dec. 28, 1965

3,226,607
ELECTRICAL CAPACITOR
Hans Eugen Lauckner, Weissenburg, Bavaria, Germany, assignor, by mesne assignments, to International Standard Electric Corporation, New York, N.Y., a corporation of Delaware
Filed May 26, 1960, Ser. No. 31,832
Claims priority, application Germany, May 30, 1959, St 15,195
10 Claims. (Cl. 317—230)

This invention relates to an electrical capacitor whose dielectric layer consists of an oxide layer produced on an electrode, and to a method of producing such a capacitor.

It has already become known to build up electrical capacitors in such a way that the dielectric layer is produced in the form of an oxide layer on one electrode of the capacitor. Electrode metals suitable for forming dielectric oxide films or layers are known as valve metals. Examples of such valve metals are tantalum, aluminium, tungsten, niobium, hafnium, titanium and zirconium.

The layer of oxide is generally produced in that the valve metal is subjected to an electrical forming process in a suitable electrolyte, or in that the valve metal is coated with an oxide layer in a suitable atmosphere either containing oxygen or emitting oxygen.

The second electrode, e.g. a metal, is brought into contact with the dielectric oxide layer in that e.g. a suitable sheetmetal or foil is pressed against the oxide layer, or in that the metal is deposited in a finely distributed form by spraying or evaporating, or in any other suitable way, as a thin metal film on the oxide layer. In this case the metal film may be so thin that it evaporates in the case of a dielectric breakdown around the point of puncture or breakdown, and that the capacitor in this way is of the self-healing type.

Another type of capacitor is built up in such a way that the second electrode is formed by a more or less liquid electrolyte arranged either in a container enclosing the anode, or else is absorbed by an absorbing layer, e.g. of paper, arranged between the oxidized anode and a further metal foil serving as the lead-in for the electrolyte.

Recently further types of capacitors have become known in which a semiconducting layer, for example of manganese dioxide, is used as the second electrode.

All of these capacitors have an anode of valve metal with a dielectric oxide layer firmly adhering thereto, obtained by an oxidation of the valve metal.

The electrical forming process may have an effect upon the thickness of the dielectric oxide layer. The longer the electrical forming process lasts, and the higher the applied forming voltages are, generally the thicker the oxide layer is. The oxide layer, however, cannot be made thicker at random. In addition thereto, under otherwise equal conditions, the capacity of the capacitor is higher the thinner the dielectric layer is. The rated voltage of such capacitors, that is, the voltage at which the capacitor can be operated, only amounts to a fraction of the forming voltage. The rated voltage is defined by a certain highest admissible leakage current. However, an increase of the forming voltage in excess of a certain limit does not effect a proportional increase of the rated voltage as defined above. In the case of tantalum electrolytic capacitors the obtainable limit lies at about 45 volts.

It is the object of the present invention to increase the achievable rated voltage in the case of electrical capacitors with a dielectric oxide layer, respectively to reduce the leakage current of the capacitor to such an extent that the capacitor can also be operated at higher voltages than was possible hitherto.

Examinations of the proceedings in the dielectric oxide layer and of the leakage current in connection therewith, of such capacitors have shown that the oxide film of a charged capacitor contains space charges which increase the field at the border between the oxide film and the cathode and this detrimental part of the field increases over the average field intensity as the thickness of the oxide layer increases. In this way, at an equal voltage, the leakage current of the capacitor increases, so that the capacitor can only be operated at a substantially lower rated voltage than actually corresponds to the thickness of the layer and the capacity. Accordingly, such capacitors can be improved by reducing the space charge in the oxide layer.

According to the invention this is accomplished in that the dielectric oxide layer contains oxides of other metals which effect a reduction of the space charge in the dielectric oxide layer.

Hence the leakage current of the capacitor is considerably reduced, and thus it becomes possible to operate such capacitors at substantially higher rated voltages than hitherto possible. For example, a tantalum electrolytic capacitor could be manufactured to be operated at a rated voltage of about 70 volts.

The additive of metal oxide must have certain properties in order to fulfill its task. These properties, however, greatly depend on the properties of the dielectric oxide layer.

According to the further embodiment of the idea of invention, therefore, only such metal oxides are used as additives whose metal has a higher valency than the metal of the dielectric oxide layer, whenever the dielectric oxide is a p-type conductor. On the other hand, whenever the dielectric oxide is an n-type conductor, a metal oxide is used as additive whose metal has a lower valency than the metal of the dielectric oxide layer.

Furthermore it is of advantage that the metal oxide to be added is chosen thus that the respective metal ion if possible has the same ion radius as the metal ion of the dielectric oxide layer.

For adding to the dielectric oxide layer it is sufficient to use a quantity of up to 3 mol percent.

Such types of additives are particularly advantageous in the case of the above mentioned tantalum electrolytic capacitors employing a semiconducting cathode. In this case, at the boundary between the tantalum oxide and the semiconductor layer positive space charges are formed which can be reduced in that titanium oxide is added to the dielectric tantalum-oxide film. As already mentioned hereinbefore it is possible to manufacture in this way tantalum electrolytic capacitors which, under otherwise the same manufacturing conditions, can be operated at rated voltages of about 70 volts compared with about 45 volts when employing no additives.

In this case neither the shape nor the embodiment of the anode is of a particular importance. The anode, for example, may consist either of a sheetmetal or wire of valve metal, or of a sintered body.

The additional oxide can be incorporated into the dielectric oxide layer in accordance with different methods.

For instance, it is possible to add the corresponding metal to the anode metal, e.g. by alloying, and thereafter to produce the dielectric oxide layer in the conventional manner on the anode. During the oxidation the oxide of the additional metal is then incorporated into the oxide of the base metal.

However, it is not absolutely necessary to incorporate the additional metal into the entire anode metal, because the additive is only essential in the dielectric oxide layer produced thereon. For this reason the anode metal only needs to be provided with a relatively thin superficial layer of additional metal, whereby the anodic valve metal is substantially pure.

Such a superficial layer can be produced e.g. in such a way that the additional metal is deposited on the anode in the form of a thin film, for example, by way of spraying, sputtering, or evaporating, or by way of a thermal decomposition of corresponding metal compounds, and is then superficially diffused into the anode metal by means of a suitable heat (thermal) treatment. Thereupon the dielectric oxide layer is formed by way of oxidation.

A further possibility for manufacturing the dielectric oxide layer on the valve metal consists in adding to the oxidizing medium such a quantity of chemical compounds of the metal of the additional oxide that together with the oxidation of the valve metal an oxide of the additional metal is formed, and incorporated into the resulting dielectric oxide layer. For example, anodes of tantalum can be subjected to a forming process up to 220 volts with 0.5 ma./cm.$^2$ in a boiling solution of potassium-titanyl-oxalate in water (0.06 molar volume), so that in this way suitable anodes for tantalum electrolytic capacitors can be produced with a semiconducting layer. During the process of forming the tantalum in the aforementioned electrolyte, titanium dioxide is incorporated into the dielectric layer of tantalum pentoxide.

The invention will now be described with reference to the sole figure which is a cross-section of a tantalum electrolytic capacitor.

The drawing schematically shows a cross section through a tantalum capacitor with solid electrolyte of semiconducting material as shown in a copending application of Wagner et al. filed Oct. 24, 1958, and now Patent 3,054,029 assigned to the same assignee as this application. 1 indicates the anode of tantalum formed as a porous sintered body. A thin layer 2 of tantalum oxide is applied upon the tantalum surface by way of anodic oxidation. The dielectric layer 2 is coated with a semiconducting layer of manganese dioxide of good conductivity. This layer is applied in several layers e.g. in two layers 3 and 4. The next layer is a graphite layer 5, which is in close electric contact with the layer 4. 6 indicates the counterelectrode created by evaporation or metal-spraying. One of the electrode leads, lead 7, is embedded in the sintered body and is led out through the casing 6. The other electrode lead 8 is closely fastened at the casing and electrically connected with it.

In such tantalum capacitors additions of metal oxide are preferably used according to the invention. In this case, positive space charges are formed at the boundary line between the tantalum oxide layer 2 and the manganese dioxide layer 3; the positive space charges being reduced by adding titanium oxide to the dielectric tantalum oxide film 2. In this manner an oxide film (not shown) is created which is a compound of the valve metal oxide and the additional metal oxide because tantalum ions are substituted by titanium ions. Such a substitution can easily be effected because $Ta^{5+}$ and $Ti^{3+}$ have approximately the same ion radius in the oxide. This theory is more fully set forth in the article "Controlled-Valency Semiconductors" by Verwey et al. in the Phillips Research Reports, vol. 5, published in 1950, pages 173–187.

However, the invention is in no way restricted to the given examples of embodiment described hereinbefore. In any case capacitors with a dielectric oxide layer can be manufactured whose leakage current is lower than when adding no oxide to the dielectric layer. Such capacitors can be operated at substantially higher voltages than the hitherto conventional types of capacitors.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An electrical capacitor comprising an electrode of a valve metal, an anodic dielectric oxide film on the surface of said electrode, said oxide film comprising oxide of a first valve metal and oxide of a second valve metal, a second electrode disposed over the exposed surface of the dielectric film and being separated from the first electrode thereby, said oxide of the first valve metal including metal oxide ions of p-type conductivity having the metal component therein at a first valence, and said oxide of the second valve metal including metal oxide ions of p-type conductivity having the metal component therein at a second valence higher than the valance of the metal component in the first valve metal oxide ions whereby the resistivity of the dielectric oxide film is greater than the resistivity of a film of a single one of said oxides.

2. An electrical capacitor according to claim 1 wherein said oxide of said second valve metal is disposed as a film on said oxide of said first valve metal.

3. An electrical capacitor as claimed in claim 1 in which the anodic oxide is a p-type conductor and the base metal of the further metal oxide has a higher valence.

4. An electrical capacitor as claimed in claim 3 in which the further metal's ion radius is approximately the same as the ion radius of the anodic metal ion.

5. An electrical capacitor as claimed in claim 4, in which the anodic oxide dielectric layer contains up to 3 mol. percent of the further metal oxide.

6. An electrical capacitor comprising an electrode of a valve metal, an anodic dielectric oxide film on the surface of said electrode, said oxide film comprising oxide of a first valve metal and oxide of a second valve metal, a second electrode disposed over the exposed surface of the dielectric film and being separated from the first electrode thereby, said oxide of the first valve metal including metal oxide ions of n-type conductivity having the metal component therein at a first valence, and said oxide of the second valve metal including metal oxide ions of n-type conductivity having the metal component therein at a second valence lower than the valence of the metal component in the first valve metal oxide ions whereby the resistivity of the dielectric oxide film is greater than the resistivity of a film of a single one of said oxides.

7. An electrical capacitor according to claim 6 wherein said oxide of said second valve metal is disposed as a film on said oxide of said first valve metal.

8. An electrical capacitor as claimed in claim 6 in which the anodic oxide is an n-type conductor and the base metal of the further metal oxide has a lower valence.

9. An electrical capacitor as claimed in claim 8 in which the further metal's ion radius is approximately the same as the ion radius of the anodic metal ion.

10. An electrical capacitor as claimed in claim 9 in which the anodic oxide dielectric layer contains up to 3 mol. percent of the further metal oxide.

References Cited by the Examiner
UNITED STATES PATENTS

| | | | |
|---|---|---|---|
| 2,231,373 | 2/1941 | Schenk | 204—58 |
| 2,299,228 | 10/1942 | Gray et al. | 204—56 |
| 2,504,178 | 4/1950 | Burnham et al. | 204—56 |
| 2,739,110 | 3/1956 | Ruscetta et al. | 204—56 |
| 2,836,776 | 5/1958 | Ishikawa et al. | 317—242 |

JOHN W. HUCKERT, *Primary Examiner.*

JOSEPH REBOLD, JAMES D. KALLAM, DAVID J. GALVIN, *Examiners.*